(12) United States Patent
Chin et al.

(10) Patent No.: US 10,800,379 B2
(45) Date of Patent: Oct. 13, 2020

(54) VEHICLE SYSTEM AND CONTROL METHOD THEREOF

(71) Applicants: Hyundai Motor Company, Seoul (KR); Kia Motors Corporation, Seoul (KR)

(72) Inventors: Kyuhwan Chin, Gwangmyeong-si (KR); SeokHan Lee, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 142 days.

(21) Appl. No.: 15/835,252

(22) Filed: Dec. 7, 2017

(65) Prior Publication Data

US 2018/0370486 A1    Dec. 27, 2018

(30) Foreign Application Priority Data

Jun. 27, 2017  (KR) .......................... 10-2017-0080856

(51) Int. Cl.
*H04L 29/06*  (2006.01)
*B60R 25/20*  (2013.01)
(Continued)

(52) U.S. Cl.
CPC .......... *B60R 25/20* (2013.01); *B60R 16/0231* (2013.01); *B60R 25/10* (2013.01);
(Continued)

(58) Field of Classification Search
CPC .. H04W 12/06; H04W 12/0609; B60R 25/10; B60R 2325/103; B60R 2325/205;
(Continued)

(56) References Cited

U.S. PATENT DOCUMENTS 9,875,589 B1 *  1/2018  Buttolo ................. G08G 1/202
2011/0137490 A1 *  6/2011  Bosch .................... G08C 17/02
701/2
(Continued)

FOREIGN PATENT DOCUMENTS

EP    2 743 868 A1    12/2012
EP    2743868 A1 *  6/2014  ............. G06Q 10/02
(Continued)

OTHER PUBLICATIONS

Menezes et al., "Handbook of applied cryptography", Dec. 16, 1996, CRC Press, 1E, ISBN-13: 978-0849385230, p. 543-590 (Year: 1996).*
(Continued)

*Primary Examiner* — Chau Le
*Assistant Examiner* — Han Yang
(74) *Attorney, Agent, or Firm* — Morgan, Lewis & Bockius LLP (57) ABSTRACT

A vehicle system may include a vehicle configured to store a public key of the vehicle and a private key of the vehicle; a portable terminal configured to store the public key of the vehicle, a public key of the portable terminal, and a private key of the portable terminal; and a server configured to generate a token and encrypt the token with the public key of the vehicle and the public key of the portable terminal.

12 Claims, 8 Drawing Sheets

(51) Int. Cl.
*H04W 12/06* (2009.01)
*B60R 16/023* (2006.01)
*B60R 25/10* (2013.01)
*B60R 25/24* (2013.01)
*G07C 9/00* (2020.01)

(52) U.S. Cl.
CPC ....... *B60R 25/241* (2013.01); *H04W 12/0609* (2019.01); *B60R 2325/103* (2013.01); *B60R 2325/108* (2013.01); *B60R 2325/205* (2013.01); *G07C 2009/00865* (2013.01)

(58) Field of Classification Search
CPC . B60R 2325/108; B60R 25/20; B60R 25/241; B60R 25/24; B60R 16/0231; G07C 2009/00865; G07C 2009/00412; G07C 9/00309; G07C 9/00571
See application file for complete search history.

(56) References Cited

U.S. PATENT DOCUMENTS

| | | | | |
|---|---|---|---|---|
| 2013/0166456 | A1* | 6/2013 | Zhang | G06Q 20/38215 705/67 |
| 2013/0179005 | A1* | 7/2013 | Nishimoto | B60R 25/1001 701/2 |
| 2014/0270158 | A1* | 9/2014 | Peirce | H04L 9/0819 380/44 |
| 2015/0175127 | A1 | 6/2015 | Hatton | |
| 2016/0203661 | A1 | 7/2016 | Pudar et al. | |
| 2017/0310674 | A1* | 10/2017 | Markham | B60R 16/0231 |
| 2017/0374550 | A1* | 12/2017 | Auer | H04B 5/0025 |
| 2018/0183608 | A1* | 6/2018 | Koyun | H04L 63/0428 |
| 2019/0028443 | A1* | 1/2019 | Chin | H04L 63/061 |

FOREIGN PATENT DOCUMENTS

| | | |
|---|---|---|
| JP | 2015052223 A | 3/2015 |
| JP | 2015059398 A | 3/2015 |
| KR | 10-2011-0004294 A | 8/2012 |
| KR | 10-2011-0056748 A | 12/2012 |
| KR | 10-2013-0149806 A | 6/2015 |
| KR | 10-2015-0107591 A | 9/2015 |
| KR | 10-2016-0109798 A | 9/2016 |
| WO | WO 2016/102888 A1 | 6/2016 |
| WO | WO 2016/108011 A1 | 7/2016 |

OTHER PUBLICATIONS

Sanyal et al., "A comparative survey of symmetric and asymmetric key cryptography", 2014, ieee ICECCE, 978-1-4799-5748-4/14, p. 83-93 (Year: 2014).*

Peter Chang, "3 Main Types of Encryption: Hash, Symmetric, Asymmetric", May 4, 2017, https://medium.com/@peterchang_82818/review-3-main-types-of-encryption-hash-symmetric-asymmetric-tutorial-example-understand-5e57c290324c (Year: 2017).*

* cited by examiner

VEHICLE SYSTEM AND CONTROL METHOD THEREOF

CROSS-REFERENCE TO RELATED APPLICATION(S)

The present application claims priority to Korean Patent Application No. 10-2017-0080856, filed on Jun. 27, 2017, the entire contents of which is incorporated herein for all purposes by this reference.

BACKGROUND OF THE INVENTION

Field of the Invention

The present invention relates to a vehicle system that registers a portable terminal in a vehicle and a method of controlling the vehicle system.

Description of Related Art

A remote control system of a vehicle enables a driver to open or close doors and start the vehicle outside the vehicle without inserting a key into a key box of the vehicle or performing any action to operate the vehicle and a remote control device such as a portable smart card or a FOB for wireless communications has been used therefor.

In recent years, handheld portable terminals as well as the FOB have been used for remote control of the vehicle. However, in case of a portable terminal that is not manufactured by the same manufacturer as that of the vehicle, there is a need to register the portable terminal in the vehicle as a remote control device.

Conventionally, complicated authentication methods have been used to register a portable terminal in a vehicle. For example, after a vehicle arbitrarily generates and displays a pin code and the user inputs the same code as the displayed pin code to the portable terminal, mutual authentication is performed.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle system in which a complicated authentication process between a portable terminal and a vehicle is simplified and a method of controlling the same.

Various aspects of the present invention are directed to providing a vehicle system configured for registering a portable terminal in a vehicle even when the vehicle is in a state where wireless communications between the vehicle and a server is unavailable and a method of controlling the same.

Additional aspects of the disclosure will be set forth in part in the description which follows and, in part, will be obvious from the description, or may be learned by practice of the disclosure.

In accordance with one aspect of the present invention, a vehicle system may include: a vehicle configured to store a public key of the vehicle and a private key of the vehicle; a portable terminal configured to store the public key of the vehicle, a public key of the portable terminal, and a private key of the portable terminal; and a server configured to generate a token and encrypt the token with the public key of the vehicle and the public key of the portable terminal.

The portable terminal transmits the public key of the portable terminal and the public key of the vehicle to the server, may be configured to receive a token encrypted with the public key of the vehicle and a token encrypted with the public key of the portable terminal from the server and transmits the token encrypted with the public key of the vehicle to the vehicle, and decrypts the token encrypted with the public key of the portable terminal using the private key of the portable terminal.

The vehicle receives the token encrypted with the public key of the vehicle from the portable terminal and decrypts the token encrypted with the public key of the vehicle using the private key of the vehicle.

The portable terminal may be configured to receive the public key of the vehicle from the vehicle.

The portable terminal may be configured to receive the public key of the vehicle via a short-range communication method.

A vehicle identifier may be attached to the vehicle and the portable terminal may be configured to determine the public key of the vehicle by recognizing the vehicle identifier attached to the vehicle.

The vehicle identifier may comprise at least one of a bar code and a QR code.

The portable terminal may be configured to transmit a token creation request signal to the server, and the server may be configured to generate the token upon receiving the token creation request signal.

The portable terminal may be configured to transmit the token creation request signal, the public key of the portable terminal, and the public key of the vehicle to the server upon receiving a create token command via a terminal input device.

The portable terminal may be configured to generate a private key and a public key of the portable terminal and store the generated private key and public key in a terminal storage device upon receiving a generate token command via a terminal input device.

The vehicle may be configured to store a token decrypted using the private key of the vehicle as a first token and, upon receiving a second token from the portable terminal, authenticate the portable terminal based on whether or not the first token is the same as the second token.

In accordance with one aspect of the present invention, a method of controlling a vehicle system may include: transmitting a public key of a portable terminal and a public key of a vehicle to a server, the transmitting being performed by the portable terminal; creating a token and encrypting the token with the received public key of the portable terminal and the received public key of the vehicle, the creating and encrypting being performed by the server; and transmitting an encrypted token encrypted with the public key of the portable terminal and an encrypted token encrypted with the public key of the vehicle to the portable terminal, the transmitting being performed by the server. The method further may include: decrypting the received encrypted token encrypted with the public key of the portable terminal using a private key of the portable terminal and transmitting the received encrypted token encrypted with the public key of the vehicle to the vehicle, the decrypting and transmitting being performed by the portable terminal; and decrypting the received encrypted token encrypted with the public key of the vehicle using a private key of the vehicle, the decrypting being performed by the vehicle.

The method may further include receiving the public key of the vehicle from the vehicle, the receiving being performed by the portable terminal, before the portable terminal transmits the public key of the portable terminal and the public key of the vehicle to the server.

The portable terminal may be configured to receive the public key of the vehicle via a short-range communication method.

A vehicle identifier may be attached to the vehicle, and the method may further include determining the public key of the vehicle by recognizing the vehicle identifier attached to the vehicle, the determining being performed by the portable terminal, before the portable terminal transmits the public key of the portable terminal and the public key of the vehicle to the server.

The vehicle identifier may comprise at least one of a bar code and a QR code.

The method may further include transmitting a token creation request signal to the server, the transmitting being performed by the portable terminal, before the portable terminal transmits the public key of the portable terminal and the public key of the vehicle to the server, the creating of the token performed by the server may comprise creating a token when the server receives the token creation request signal.

The method may further include receiving a generate token command via a terminal input device, the receiving being performed by the portable terminal, before transmitting the token creation request signal to the server, the transmitting of the token creation request signal to the server is performed by transmitting the token creation request signal to the server, the transmitting being performed by the portable terminal, when the terminal input device receives the generate token command.

The method may further include receiving a generate token command via the terminal input device, the receiving being performed by the portable terminal, before transmitting the token creation request signal to the server, the transmitting of the token creation request signal to the server may include creating a private key and a public key of the portable terminal, the creating being performed by the portable terminal, when the terminal input device receives the generate token command.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and the intended shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in detail to the exemplary embodiments of the present invention, examples of which are illustrated in the accompanying drawings, wherein like reference numerals refer to like elements throughout. This specification does not describe all elements of the exemplary embodiments of the present invention and detailed descriptions on what are well-known in the art or redundant descriptions on substantially the same configurations may be omitted. The terms 'unit', 'module', 'member', or 'block' used herein may be implemented using a software or hardware component. According to an exemplary embodiment of the present invention, a plurality of 'units', 'modules', 'members', or 'blocks' may also be implemented using an element and one 'unit', 'module', 'member', or 'block' may include a plurality of elements.

Throughout the specification, when an element is referred to as being "connected to" another element, it may be directly connected to the other element or indirectly connected to the other element via a wireless communication network.

Also, it is to be understood that the terms "include" and "have" are intended to indicate the existence of elements included in the specification, and are not intended to preclude the possibility that one or more other elements may exist or may be added.

In the present specification, terms "first", "second", etc. are used to distinguish one component from other components and, therefore, the components are not limited by the terms.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Throughout the specification, the terms "public key" and "private key" are inherent symmetric key pairs of each device assigned to the device. The public key is used to encrypt data and the private key is used to decrypt data. That is, a file of a device encrypted with a public key may be decrypted using a private key of the device and cannot be decrypted using a private key of another device.

Hereinafter, operating principles and embodiments of the present invention will be described with reference to the accompanying drawings.

Figure 1:
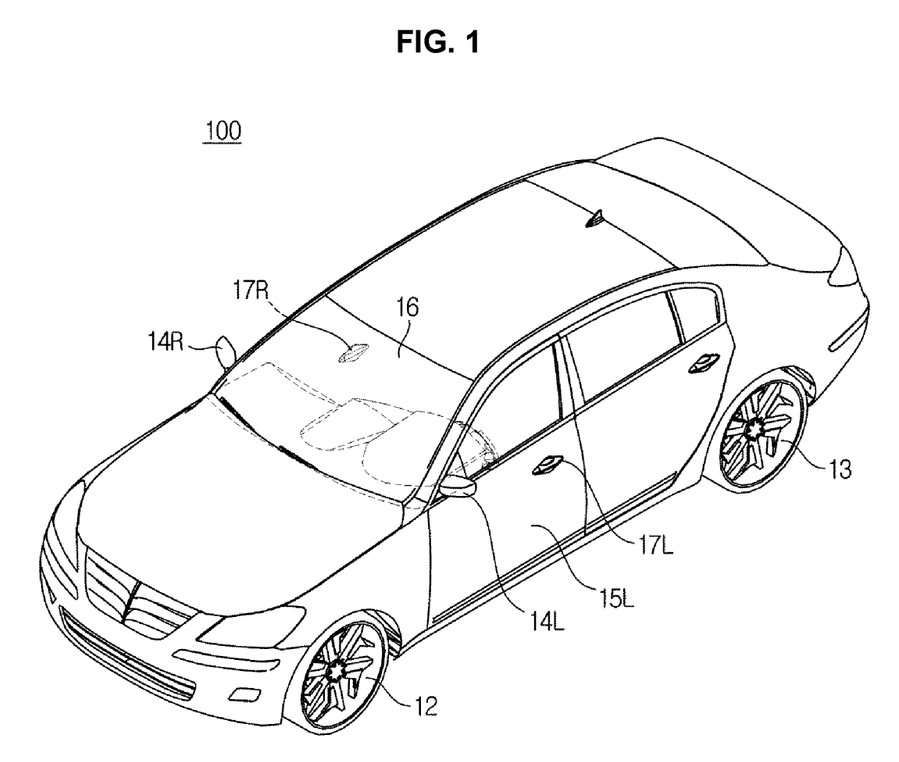
FIG. 1 is an external view of a vehicle according to an exemplary embodiment.
Figure 2:
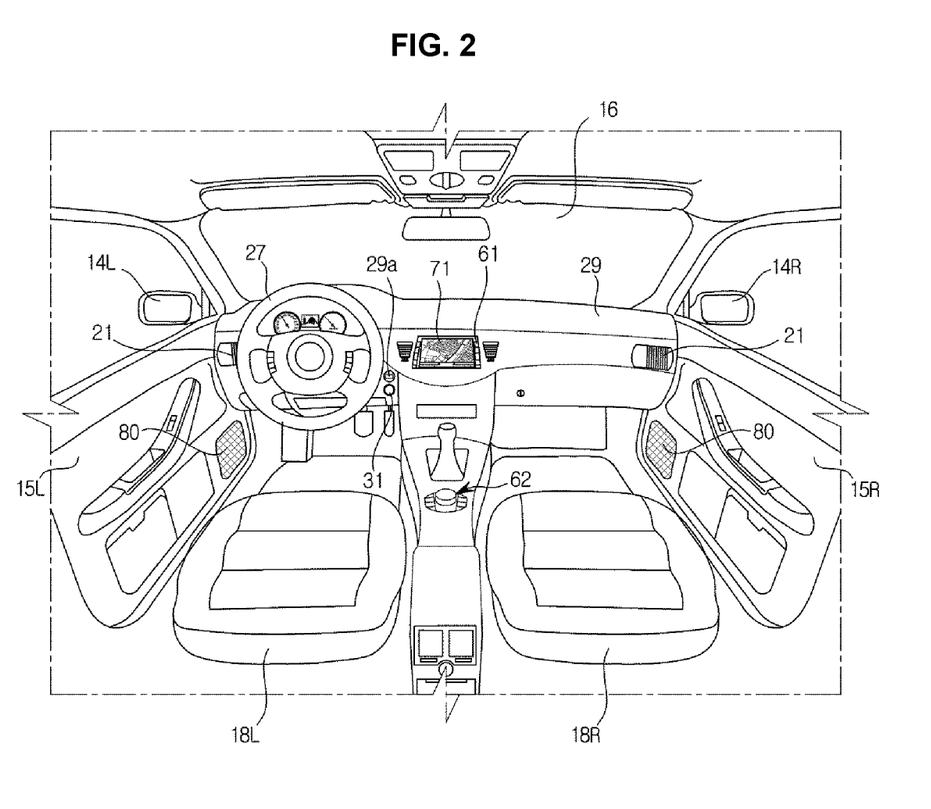
FIG. 2 is a view illustrating an internal structure of the vehicle.

FIG. 1 is an external view of a vehicle according to an exemplary embodiment. FIG. 2 is a view illustrating an internal structure of the vehicle.

Referring to FIG. 1, the external of the vehicle 100 according to an exemplary embodiment of the present invention may include wheels 12 and 13 configured to move the vehicle 100, doors 15L configured to shield the inside of the vehicle 100 from the outside, a front glass 16 configured to allow a driver within the vehicle 100 to look ahead of the vehicle 100, and side mirrors 14L and 14R to allow the driver to see areas behind the vehicle 100.

The wheels 12 and 13 include front wheels 12 disposed at front portions of the vehicle 100 and rear wheels 13 disposed at rear portions of the vehicle 100. A driving device disposed within the vehicle 100 provides a rotational force to the front wheels 12 or the rear wheels 13 to move the vehicle 100 forward or backward thereof. The driving device may include an engine configured to generate the rotational force via combustion of fossil fuels or a motor configured to generate the rotational force upon receiving the power from a battery.

The doors 15L and 15R (FIG. 2) are pivotally coupled to the vehicle 100 at left and right sides and a driver or a passenger may get into the vehicle 100 by opening the door and the inside of the vehicle 100 may be shielded from the outside by closing the door. Furthermore, handles 17L and 17R to open or close the doors 15L and 15R (FIG. 2) may be provided at the external of the vehicle 100.

When a touch detector of the doors 15L and 15R detects a touch input of a user while the user is carrying a portable terminal 200 (FIG. 3) registered in the vehicle 100, the vehicle 100 performs authentication of the portable terminal 200 via a wireless communication network. Upon completion of the authentication, a door lock of the vehicle 100 is released and the door 15L or 15R may be open as the user pulls the handle of 17L or 17R. In this regard, the user may include not only the driver but also the passenger on board the vehicle 100 referring to a person carrying the portable terminal 200.

The front glass 16 is disposed at a front upper portion of a body to allow the driver within the vehicle 100 to acquire visual information related to the view in front of the vehicle 100 and is also called a windshield glass.

Also, the side mirrors 14L and 14R include a left side mirror 14L disposed on the left side of the vehicle 100 and a right side mirror 14R disposed on the right side of the vehicle 100 for helping the driver within the vehicle 100 to acquire visual information related to areas behind and to the side of the vehicle 100.

Furthermore, the vehicle 100 may further include a detecting device including a proximity detector to detect an obstacle or another vehicle beside or behind the vehicle 10, a rain detector to detect the presence of rain and rainfall, and a camera.

Referring to FIG. 2, an audio video navigation (AVN) display 71 and an AVN input device 61 may be disposed at a central region of a dashboard 29. The AVN display 71 may display at least one of an audio screen, a video screen, and a navigation screen, selectively, and also various control screens related to the vehicle 100 or screens related to additional functions.

The AVN display 71 may be implemented using a liquid crystal display (LCD), a light emitting diode (LED), a plasma display panel (PDP), an organic light emitting diode (OLED), a cathode ray tube (CRT), or the like.

The AVN input device 61 may be provided as a hard key type at an area adjacent to the AVN display 71 or as a touch panel type on the front surface of the AVN display 71 when the AVN display 71 is implemented using a touch screen type.

Furthermore, a jog shuttle type central input device 62 may be provided between a driver's seat 18L and a front passenger's seat 18R. The user may input a control command by turning the central input device 62 or pressing or pushing the central input device 62 upward, downward, leftward, or rightward.

The vehicle 100 may be provided with a sound output device 80 to output sounds and the sound output device 80 may be a speaker. The sound output device 80 may output sounds required to perform audio functions, video functions, navigation functions, and other additional functions.

A steering wheel 27 may be provided on a dashboard 29 of the driver's seat 18L and a key slot 29a for insertion of a FOB may be formed in an area adjacent to the steering wheel 27. When the FOB is inserted into the key slot 29a or authentication between the FOB or the portable terminal 200 and the vehicle 100 is completed via a wireless communication network, the FOB or the portable terminal 200 may be connected to the vehicle 100.

Also, the dashboard 29 may be provided with a start button 31 to control on/off of the start of the vehicle 100. When the FOB is inserted into the key slot 29a or when authentication is performed by transmitting/receiving authentication data (hereinafter, referred to as "token") between a vehicle short-range communication module disposed adjacent to the start button 31 and a terminal short-range communication module of the portable terminal 200 registered in the vehicle 100 and the user presses the start button 31, the vehicle 100 may be started.

Meanwhile, the vehicle 100 may be provided with an air conditioner to perform both heating and cooling and temperature within the vehicle 100 may be adjusted by discharging heated or cooled air through an air vent 21.

Figure 3:
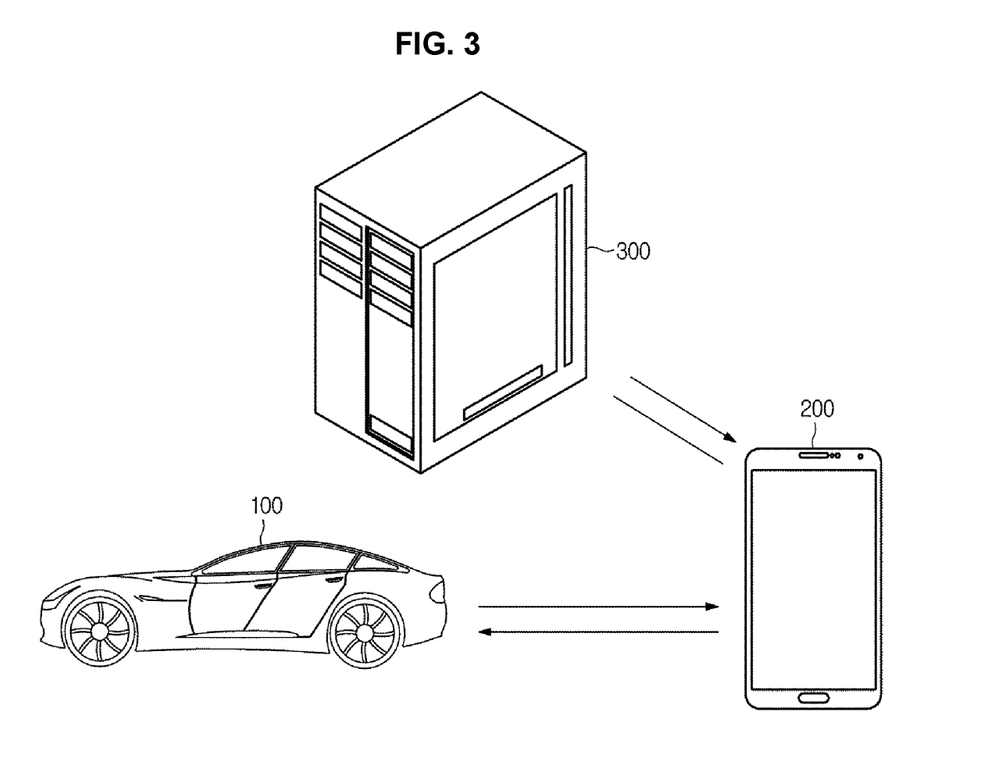
FIG. 3 is a schematic diagram illustrating a vehicle system according to an exemplary embodiment.
Figure 4:
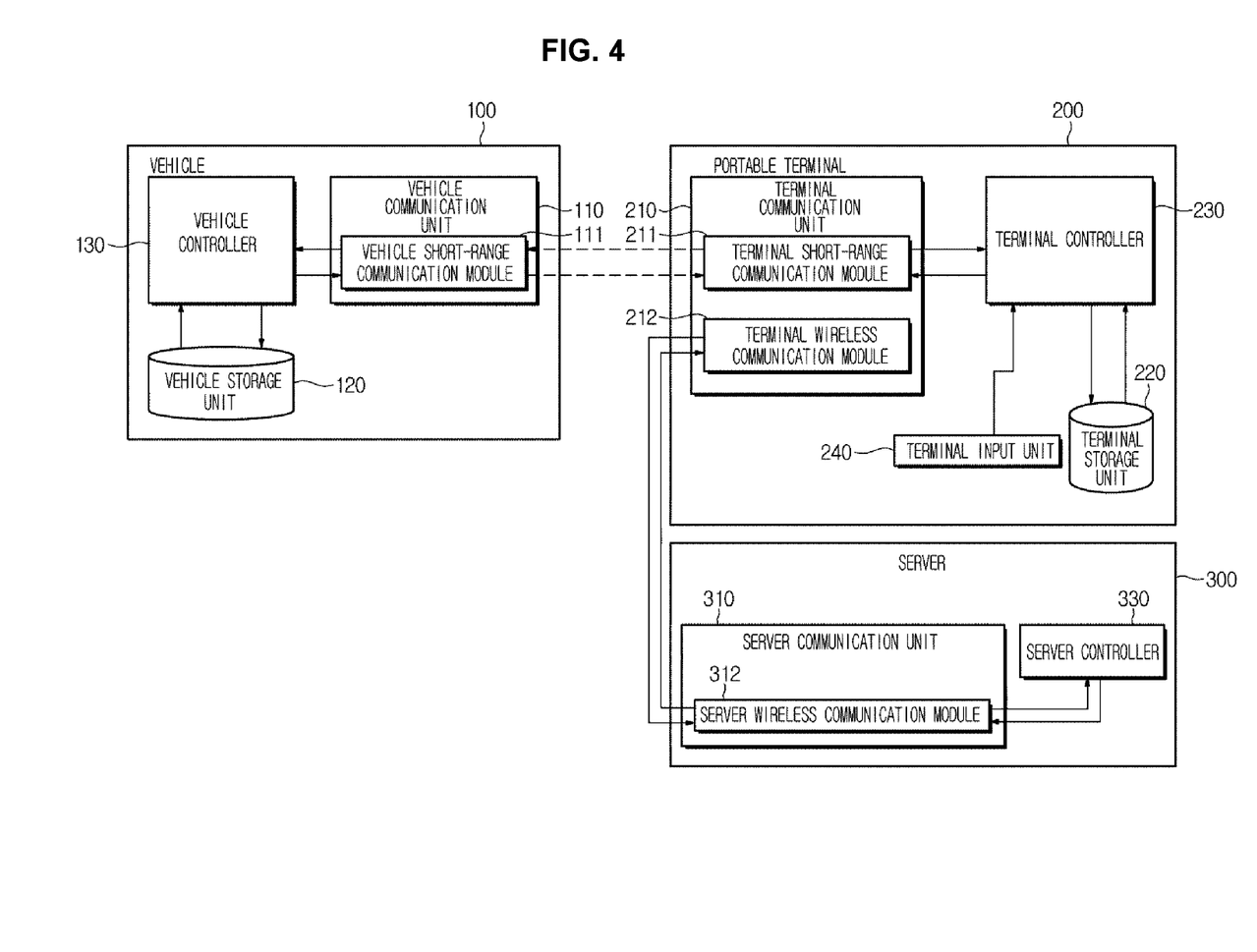
FIG. 4 is a control block diagram of the vehicle system.

FIG. 3 is a schematic diagram illustrating a vehicle system according to an exemplary embodiment. FIG. 4 is a control block diagram of the vehicle system.

Referring to FIG. 3, the vehicle system includes a vehicle 100, a portable terminal 200, and a server 300.

The vehicle 100 may be connected to the portable terminal 200 via a short-range communication network. In this regard, exemplary embodiments of the short-range communication network may include wireless local area network (wireless LAN), Wi-Fi, Bluetooth, ZigBee, Wi-Fi Direct (WFD), Ultra-Wideband (UWB), Infrared Data Association (IrDA), Bluetooth Low Energy (BLE), Near Field Communication (NFC), and Radio Frequency Identification (RFID), without being limited thereto.

According to an exemplary embodiment of the present invention, since the vehicle 100 includes an NFC tag that includes information on a public key of the vehicle 100 and the portable terminal 200 includes a terminal short-range communication module 211 (FIG. 4) that recognizes the NFC tag of the vehicle 100, the public key of the vehicle 100 may be transmitted to the portable terminal 200.

Furthermore, a token generated by the server 300 and encrypted with the public key of the vehicle 100 may also be transmitted to the vehicle 100 from the portable terminal 200 via a short-range communication network. In the instant case, an NFC module may also be used.

A vehicle short-range communication module 111 (FIG. 4) may employ various short-range communication modules supporting the aforementioned short-range communication network without being limited to the NFC tag.

The portable terminal 200 may be implemented using any computer or portable terminal configured for accessing the server 300 via the wireless communication network. In the instant case, exemplary embodiments of the computer may include a notebook computer, desktop, laptop, tablet PC, and slate PC mounted with a WEB Browser. For example, the portable terminal may be a wireless communication device that guarantees portability and mobility and include all types of handheld devices including personal communication system (PCS), global system for mobile communications (GSM), personal digital cellular (PDC), personal handyphone system (PHS), personal digital assistant (PDA), International Mobile Telecommunications-2000 (IMT-2000) terminal, Code Division Multiple Access-2000 (CDMA-2000) terminal, Wideband Code Division Multiple Access (W-CDMA) terminal, Wireless Broadband Internet (WiBro) terminal, and smartphone and wearable devices including watch, ring, bracelet, anklet, necklace, glasses, contact lenses, or head-mounted device (HMD).

The portable terminal 200 may run an application disposed therein and perform a process of recognizing the NFC tag of the vehicle 100 by running the application.

Furthermore, the portable terminal 200 may transmit not only a public key of the portable terminal 200 but also the public key of the vehicle 100 received from the vehicle 100 to the server 300 via a wireless signal transmitting/receiving process with the server 300 and receive a token encrypted by the server 300. The signal transmitting/receiving process will be described in more detail later.

Hereinafter, components of the vehicle 100, the portable terminal 200, and the server 300 constituting the vehicle system will be described more specifically.

Referring to FIG. 4, the vehicle 100 according to an exemplary embodiment of the present invention includes a vehicle communication device 110, a vehicle storage device 120, and a controller 130.

The vehicle communication device 110 includes the vehicle short-range communication module 111 that accesses the portable terminal 200 via the short-range communication network.

Upon receiving a public key request signal from the portable terminal 200, the vehicle short-range communication module 111 transmits the public key of the vehicle 100 stored in the vehicle storage device 120 (or stored in a memory of the vehicle short-range communication module 111) to the portable terminal 200.

Furthermore, the vehicle short-range communication module 111 according to an exemplary embodiment of the present invention may receive a token encrypted with the public key of the vehicle 100 from the portable terminal 200.

The vehicle short-range communication module 111 may be implemented using a wireless LAN module, a Wi-Fi module, a Bluetooth module, a ZigBee module, a Wi-Fi Direct (WFD) module, an Ultra-Wideband (UWB) module, an Infrared Data Association (IrDA) module, a Bluetooth Low Energy (BLE) module, a Near Field Communication (NFC) module, a Radio Frequency Identification (RFID) module, or the like without being limited thereto.

Hereinafter, an NFC module including an NFC tag will be referred to as an exemplary embodiment of the vehicle short-range communication module 111 for descriptive convenience.

The vehicle storage device 120 stores a public key and a private key of the vehicle 100. The public key and the private key of the vehicle 100 are unique identifiers assigned to the vehicle 100 at the time of manufacture of the vehicle 100. While the public key may be shared with the portable terminal 200 and the server 300, the private key cannot be shared therewith.

The public key of the vehicle 100 may be temporarily stored in a memory of the vehicle short-range communication module 111 and transmitted to the portable terminal 200 and finally to the server 300.

The vehicle storage device 120 may be implemented using at least one of non-volatile memory including Cache, Read Only Memory (ROM), Programmable ROM (PROM), Erasable Programmable Read Only Memory (EPROM), Electrically Erasable Programmable Read Only Memory (EEPROM), and flash memory, volatile memory including Random Access Memory (RAM), and a storage medium including hard disc drive (HDD), and CD-ROM, without being limited thereto. The vehicle storage device 120 may be a memory implemented as a separate chip from a processor of the controller 130 or a single chip integrated with the processor.

The controller 130 generates a control signal to control various components of the vehicle 100.

The controller 130 may be implemented using a memory that stores algorithms to control the operation of components of the vehicle 100 or data on programs to run the algorithms and a processor or that performs the aforementioned operation by use of data stored in the memory. In the instant case, the memory and the processor may be implemented as separate chips. Alternatively, the memory and the processor may be implemented as a single chip.

The controller 130 according to an exemplary embodiment of the present invention may generate a control signal to control the vehicle short-range communication module 111.

When the vehicle short-range communication module 111 receives the public key request signal from the portable terminal 200, the controller 130 may control the vehicle short-range communication module 111 to transmit the public key of the vehicle 100 stored in the vehicle storage device 120 or the vehicle short-range communication module 111 to the portable terminal 200.

Furthermore, when the vehicle short-range communication module 111 receives a token encrypted with the public key of the vehicle 100 from the portable terminal 200, the controller 130 according to an exemplary embodiment of the present invention may decrypt the token encrypted with the public key of the vehicle 100 using a private key stored in the vehicle storage device 120. As a result of decryption, the token may be collected and the controller 130 may store the collected token in the vehicle storage device 120. The token stored in the vehicle storage device 120 may be used later for authentication of the registered portable terminal 200.

The portable terminal 200 according to an exemplary embodiment of the present invention includes a terminal communication device 210, a terminal storage device 220, a terminal controller 230, and a terminal input device 240.

The terminal communication device 210 includes a terminal short-range communication module 211 connected to the vehicle 100 via a short-range communication network and a terminal wireless communication module 212 connected to the server 300 via a wireless communication network.

Upon receiving a create token command from the user via the terminal input device 240, the terminal short-range communication module 211 according to an exemplary embodiment of the present invention may transmit a public key request signal to the vehicle 100 in accordance with a control signal of the terminal controller 230.

Furthermore, the terminal short-range communication module 211 may receive the public key of the vehicle 100 from the vehicle 100. The public key of the vehicle 100 may be transmitted to the terminal controller 230.

Furthermore, the terminal short-range communication module 211 according to an exemplary embodiment of the present invention may transmit a token encrypted with the public key of the vehicle 100 to the vehicle 100 in accordance with a control signal of the terminal controller 230.

The terminal short-range communication module 211 may be implemented using a wireless LAN module, a Wi-Fi module, a Bluetooth module, a ZigBee module, a Wi-Fi Direct (WFD) module, an Ultra-Wideband (UWB) module, an Infrared Data Association (IrDA) module, a Bluetooth Low Energy (BLE) module, a Near Field Communication (NFC) module, and a Radio Frequency Identification (RFID) module corresponding to the vehicle short-range communication module 111.

Hereinafter, an NFC module will be referred to as an exemplary embodiment of the terminal short-range communication module 211 for descriptive convenience.

Upon receiving the create token command from the user via the terminal input device 240, the terminal wireless communication module 212 according to an exemplary embodiment of the present invention may transmit a token creation request signal to the server 300 in accordance with a control signal of the terminal controller 230.

Furthermore, the terminal wireless communication module 212 may transmit the public key of the vehicle 100 and the public key of the portable terminal 200 to the server 300.

Furthermore, the terminal wireless communication module 212 receives a token encrypted with the public key of the vehicle 100 and a token encrypted with the public key of the portable terminal 200 from the server 300.

The terminal wireless communication module 212 may also include any wireless communication module supporting various wireless communication methods including a Global System for Mobile Communication (GSM) module, a code division multiple access (CDMA) module, a Wideband Code Division Multiple Access (WCDMA) module, a universal mobile telecommunications system (UMTS) module, a Time Division Multiple Access (TDMA) module, a Long Term Evolution (LTE) module in addition to the Wi-Fi module and the WiBro module.

The terminal storage device 220 stores a public key and a private key of the portable terminal 200. The public key and the private key of the portable terminal 200 are unique identifiers generated by the terminal controller 230 of the portable terminal 200. While the public key may be shared with the server 300, the private key cannot be shared therewith.

The public key of the portable terminal 200 may be temporarily stored in a memory of the terminal wireless communication module 212 and transmitted to the server 300.

Furthermore, the terminal storage device 220 may further store the public key of the vehicle 100 received from the vehicle 100.

The terminal storage device 220 may be implemented using at least one of non-volatile memory including Cache, Read Only Memory (ROM), Programmable ROM (PROM), Erasable Programmable Read Only Memory (EPROM), Electrically Erasable Programmable Read Only Memory (EEPROM), and flash memory, volatile memory including Random Access Memory (RAM), or a storage medium including hard disc drive (HDD) and CD-ROM, without being limited thereto. The terminal storage device 220 may be a memory implemented as a separate chip from a processor of the controller 130 or a single chip integrated with the processor.

The terminal controller 230 generates a control signal to control various components of the portable terminal 200.

The terminal controller 230 may be implemented using a memory that stores algorithms to control the operation of components of the portable terminal 200 or data on programs to run the algorithms and a processor or that performs the aforementioned operation by use of data stored in the memory. In the instant case, the memory and the processor may be implemented as separate chips. Alternatively, the memory and the processor may be implemented as a single chip.

Upon receiving a create token command from the user via the terminal input device 240, the terminal controller 230 according to an exemplary embodiment of the present invention may generate a public key and a private key of the portable terminal 200. For example, when the user runs an application disposed in the portable terminal 200 and inputs a create token command via the terminal input device 240, the terminal controller 230 may assign a random public key and a random private key to the portable terminal 200 and store the generated public key and private key of the portable terminal 200 in the terminal storage device 220.

Furthermore, the terminal controller 230 according to an exemplary embodiment of the present invention may generate a control signal to control the terminal short-range communication module 211.

Specifically, upon receiving the create token command via the terminal input device 240, the terminal controller 230 may control the terminal short-range communication module 211 to transmit a public key request signal to the vehicle 100.

Furthermore, upon receiving the token encrypted with the public key of the vehicle 100 and the token encrypted with the public key of the portable terminal 200 from the server 300, the terminal controller 230 may control the terminal short-range communication module 211 to transmit the token encrypted with the public key of the vehicle 100 to the vehicle 100.

Furthermore, the terminal controller 230 according to an exemplary embodiment of the present invention may generate a control signal to control the terminal wireless communication module 212.

When the terminal short-range communication module 211 receives the public key of the vehicle 100 from the vehicle 100, the terminal controller 230 may control the terminal wireless communication module 212 to transmit the token creation request signal, the received public key of the vehicle 100, and the public key of the portable terminal 200 stored in the terminal storage device 220 to the server 300.

Furthermore, the terminal controller 230 according to an exemplary embodiment of the present invention may decrypt data.

Upon receiving the token encrypted with the public key of the portable terminal 200 from the server 300, the terminal controller 230 may decrypt the token encrypted with the public key of the portable terminal 200 using the private key of the portable terminal 200 stored in the terminal storage device 220.

As a result of decryption, the token may be collected and the terminal controller 230 may store the collected token in the terminal storage device 220. Since the token stored in the terminal storage device 220 is the same as the aforementioned token stored in the vehicle storage device 120, the tokens may be used for authentication of a normally registered portable terminal 200 by the vehicle 100.

The terminal input device 240 may receive various commands input from the user.

The terminal input device 240 according to an exemplary embodiment of the present invention may receive a run application command from the user and receive a create token command when the application is run. For example, the create token command may be input by selecting one of icons displayed on a screen of the portable terminal 200.

The terminal input device 240 may include various hardware devices for user's input including a button, switch, pedal, keyboard, mouse, track-ball, lever, handle, or stick.

Furthermore, the terminal input device 240 may include a graphic user interface for user's input including a touch pad, i.e., a software device. The touch pad may be implemented using a touch screen panel (TSP) to form a layered structure together with the display device.

When the terminal input device 240 is configured with a touch screen panel TSP constituting the layered structure with the touch pad, the input device may also be used as a display device.

Hereinafter, a terminal input device 240 implemented using a touch screen panel will be described by way of example.

The server 300 according to an exemplary embodiment of the present invention may include a server communication device 310 and a server controller 320.

The server communication device 310 may include a server wireless communication module 312 connected to the portable terminal 200 via a wireless communication network.

The server wireless communication module 312 according to an exemplary embodiment receives a token creation request signal from the portable terminal 200. Upon receiving the token creation request signal, the server controller 330 generates a random token. When the portable terminal 200 is normally registered in the vehicle 100, the token is configured as a secret code shared with the vehicle 100 and the registered portable terminal 200.

Furthermore, the server wireless communication module 312 according to an exemplary embodiment receives the public key of the portable terminal 200 and the public key of the vehicle 100.

Furthermore, when the token is encrypted respectively with the public key of the portable terminal 200 and the public key of the vehicle 100 by the server controller 330, the server wireless communication module 312 transmits the tokens encrypted with the public key of the vehicle 100 and with the public key of the portable terminal 200 to the portable terminal 200 respectively.

The server wireless communication module 312 may also include any wireless communication module supporting various wireless communication methods including a Global System for Mobile Communication (GSM) module, a Code Division Multiple Access (CDMA) module, a Wideband Code Division Multiple Access (WCDMA) module, a universal mobile telecommunications system (UMTS) module, a Time Division Multiple Access (TDMA) module, a Long Term Evolution (LTE) module corresponding to the terminal wireless communication module 212 of the portable terminal 200 in addition to the Wi-Fi module and the WiBro module.

The server controller 330 generates a control signal to control various components of the server 300.

The server controller 330 may be implemented using a memory that stores algorithms to control the operation of components of the server 300 or data on programs to run the algorithms and a processor or that performs the aforementioned operation by use of data stored in the memory. In the instant case, the memory and the processor may be implemented as separate chips. Alternatively, the memory and the processor may be implemented as a single chip When the server wireless communication module 312 receives the token creation request signal, the server controller 330 according to an exemplary embodiment of the present invention may generate a random token. The token may be generated by a pre-stored algorithm or a program running the algorithm. For example, the token may be any number of six digits.

Furthermore, the server controller 330 according to an exemplary embodiment of the present invention may encrypt the token using the public key of the portable terminal 200 received by the server wireless communication module 312 and encrypt the token using the public key of the vehicle 100 received by the server wireless communication module 312 separately from the token encrypted with the public key of the portable terminal 200.

The server controller 330 according to an exemplary embodiment of the present invention may generate a control signal to control the server wireless communication module 312.

The server controller 330 may control the server wireless communication module 312 to transmit the token encrypted with the public key of the portable terminal 200 and the token encrypted with the public key of the vehicle 100 to the portable terminal 200.

Although the vehicle 100 of the vehicle system according to the embodiment described above transmits the public key of the vehicle 100 to the portable terminal 200 via the short-range communication network, the public key of the vehicle 100 may also be transmitted via any other methods.

To the present end, a vehicle 100 of a vehicle system according to another exemplary embodiment of the present invention may further include a vehicle identifier including information on the public key of the vehicle 100 and a portable terminal 200 according to the embodiment may further include a tag identifier that identifies the vehicle identifier of the vehicle 100.

The vehicle identifier of the vehicle 100 may include a QR code, a bar code, or the like attached to various positions of the vehicle 100, and the tag identifier of the portable terminal 200 may be implemented using a QR code scanner, a bar code scanner, a camera, or the like and read information related to the vehicle identifier attached to the vehicle 100.

At least one component may be added or deleted to correspond to performance of the components of the vehicle system described above. Furthermore, it will be readily understood by those skilled in the art that mutual positions of the components may be modified to correspond to performance or structure of a system.

Meanwhile, each of the components illustrated in FIG. 4 may be a software component and/or a hardware component including field programmable gate array (FPGA) and application specific integrated circuit (ASIC).

Hereinafter, a process of controlling the vehicle system according to an exemplary embodiment from a user's perspective will be described with reference to FIGS. 5 to 8.

Figure 5:
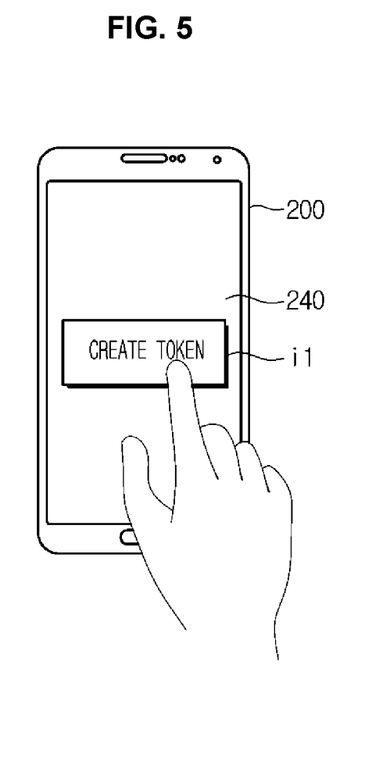
FIG. 5 is an exemplary diagram illustrating a screen displayed when an application of a portable terminal is run.
Figure 6:
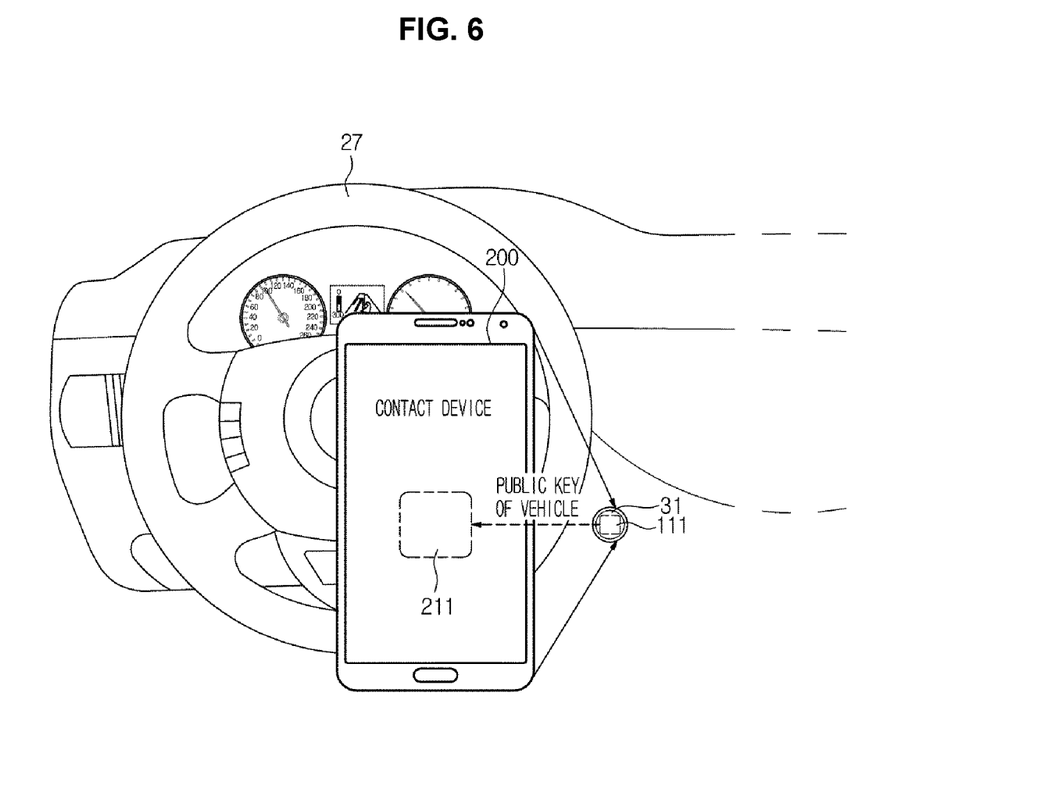
FIG. 6 is an exemplary diagram for describing a process of transmitting a public key of a vehicle to a portable terminal.
Figure 7:
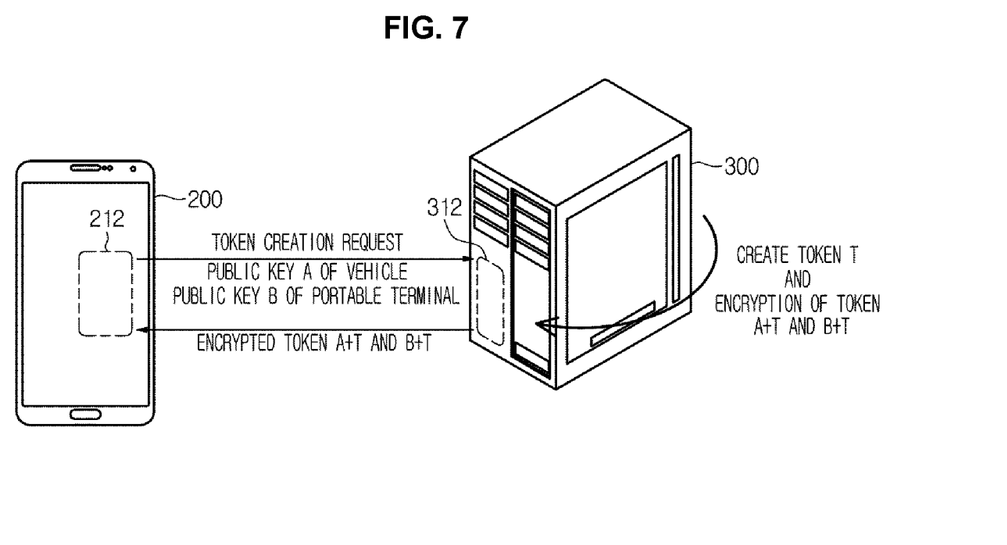
FIG. 7 is a schematic diagram for describing a process of transmitting/receiving a signal between a portable terminal and a server.
Figure 8:
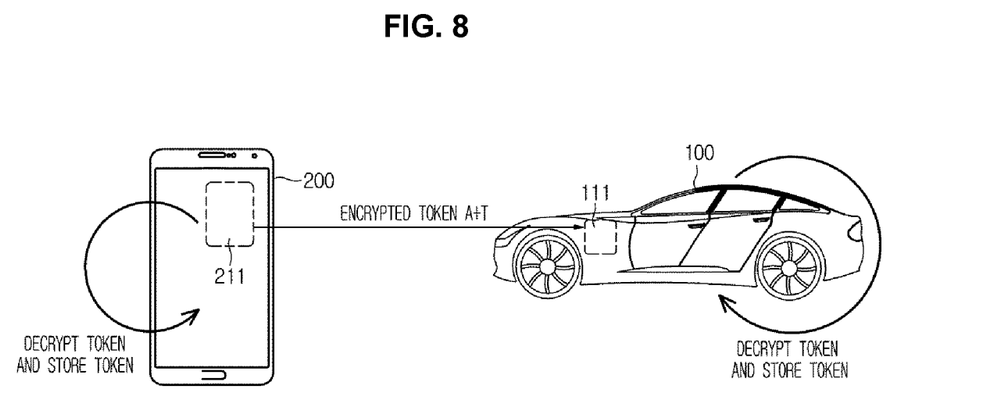
FIG. 8 is a schematic diagram for describing a process of transmitting/receiving a signal between a portable terminal and a vehicle.

FIG. 5 is an exemplary diagram illustrating a screen displayed when an application of a portable terminal is run. FIG. 6 is an exemplary diagram for describing a process of transmitting a public key of a vehicle to a portable terminal. FIG. 7 is a schematic diagram for describing a process of transmitting/receiving a signal between a portable terminal and a server. FIG. 8 is a schematic diagram for describing a process of transmitting/receiving a signal between a portable terminal and a vehicle.

Referring to FIG. 5, when the application of the portable terminal 200 is run by the user, the terminal input device 240 implemented using a touch screen panel displays an icon i1 of "create token" to the user. When the user selects the icon i1 (i.e., when the user inputs a create token command), a public key and a private key of the portable terminal 200 are created. Referring to FIG. 6, a screen requesting a user's approach may be output such that the terminal short-range communication module 211 is connected to the vehicle short-range communication module 111.

When the terminal short-range communication module 211 is connected to the vehicle short-range communication module 111, the terminal short-range communication module 211 may transmit a public key request signal to the vehicle 100 and the vehicle short-range communication module 111 having received the signal may transmit the public key of the vehicle 100 stored in the vehicle storage device 120 to the terminal short-range communication module 211.

Although FIG. 6 illustrates that the vehicle short-range communication module 111 is disposed in the start button 31 of the vehicle 100, the position of the vehicle short-range communication module 111 is not limited thereto.

Referring to FIG. 7, when the user inputs a create token command, the terminal wireless communication module 212 may transmit a token creation request signal to the server 300. When the server wireless communication module 312 receives the token creation request signal, the server controller 330 of the server 300 may generate a token t.

Furthermore, when the portable terminal 200 receives the public key of the vehicle 100 from the vehicle 100, the terminal wireless communication module 212 of the portable terminal 200 may transmit a public key a of the vehicle 100 and a public key b of the portable terminal 200 to the server 300. When the server wireless communication module 312 receives the public key a of the vehicle 100 and the public key b of the portable terminal 200, the server controller 330 of the server 300 encrypts the token t using the public key a of the vehicle 100 to generate an encrypted token a+t and may separately encrypt the token t using the public key b of the portable terminal 200 to generate an encrypted token b+t.

Each of the encrypted token a+t encrypted with the public key a of the vehicle 100 and the encrypted token b+t encrypted with the public key b of the portable terminal 200 may be transmitted to the portable terminal 200. Referring to FIG. 8, the portable terminal 200 decrypts the encrypted token b+t encrypted with the public key b of the portable terminal 200 using the private key of the portable terminal 200 to collect the token t and stores the collected token tin the terminal storage device 220. As such, the terminal short-range communication module 211 transmits the encrypted token a+t encrypted with the public key a of the vehicle 100 to the vehicle short-range communication module 111 of the vehicle 100.

When the vehicle short-range communication module 111 receives the encrypted token a+t encrypted with the public key a of the vehicle 100, the controller 130 decrypts the encrypted token a+t encrypted with the public key a of the vehicle 100 using a private key of the vehicle 100 stored in the vehicle storage device 120 and collects the token t. The collected token t is stored in the vehicle storage device 120.

Since the same token created by the server 300 according to the present procedure is stored in the vehicle 100 and the portable terminal 200 respectively, the portable terminal 200 may be registered in the vehicle 100 and the vehicle 100 and the portable terminal 200 may perform a mutual authentication process later using the same token t shared by each other. That is, the vehicle 100 may store a token t (first token) decrypted using the private key of the vehicle 100 in the vehicle 100 and, upon receiving a token (second token) from the portable terminal 200 during a next process of authenticating the portable terminal 200, the vehicle 100 may authenticate the portable terminal 200 based on whether or not the first token t is the same as the second token. When the portable terminal 200 is normally registered in the vehicle 100, the first token t will be the same as the second token.

Figure 9:
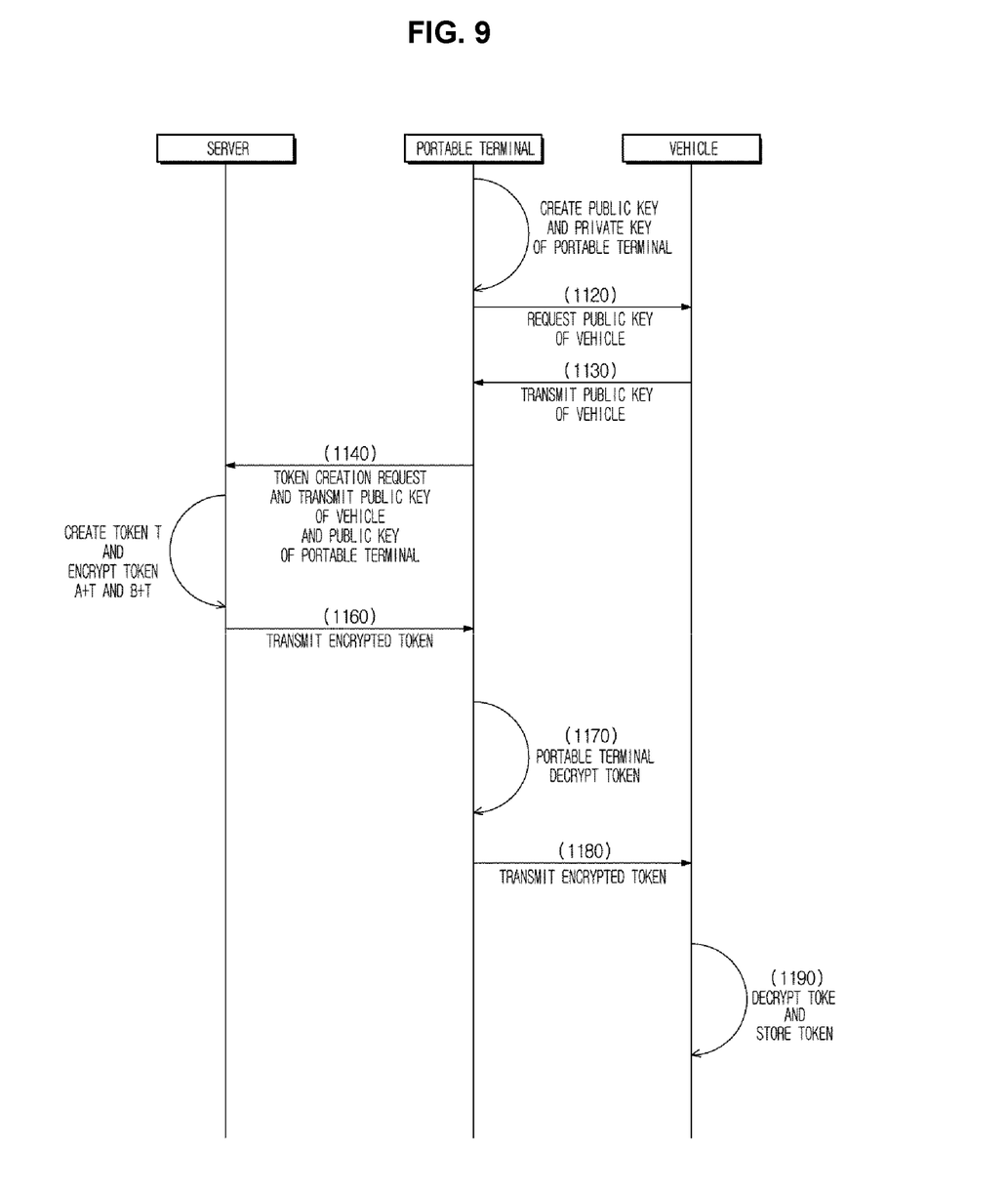
FIG. 9 is a flow chart for a method of controlling a vehicle system according to an exemplary embodiment.

Hereinafter, a method of controlling a vehicle system according to an exemplary embodiment will be described with reference to FIG. 9. Since the components of the vehicle system described with reference to FIG. 9 are the same as those of the vehicle system described above with reference to FIGS. 1 to 8, the same reference numerals will be used.

First, when the terminal input device 240 receives a create token command, the terminal controller 230 of the portable terminal 200 generates a public key and a private key of the portable terminal 200 (1110) and controls the terminal short-range communication module 211 to transmit a public key request signal to the vehicle 100 (1120).

When the vehicle short-range communication module 111 of the vehicle 100 receives the public key request signal, the controller 130 of the vehicle 100 controls the vehicle short-range communication module 111 to transmit a public key of the vehicle 100 stored in the vehicle storage device 120 to the portable terminal 200 (1130).

When the terminal short-range communication module 211 receives the public key of the vehicle 100, the terminal controller 230 of the portable terminal 200 controls the terminal wireless communication module 212 to transmit a token creation request signal to the server 300 and controls the terminal wireless communication module 212 to transmit the received public key a of the vehicle 100 and a public key b of the portable terminal 200 stored in the terminal storage device 220 to the server 300 (1140).

Meanwhile, although the terminal controller 230 controls the terminal wireless communication module 212 to transmit the token creation request signal to the server 300 when the terminal short-range communication module 211 receives the public key of the vehicle 100 according to the aforementioned embodiment, the terminal controller 230 may also control the terminal wireless communication module 212 to transmit the token creation request signal to the server 300 when the terminal input device 240 receives the create token command. The order is not limited.

Next, when the server wireless communication module 312 of the server 300 receives the token creation request signal, the server controller 330 generates a random token t (1150). Furthermore, upon receiving the public key a of the vehicle 100 and the public key b of the portable terminal 200, the server controller 330 generates an encrypted token a+t by encrypting the token t using the public key a of the vehicle 100 and an encrypted token b+t by encrypting the token t using the public key b of the portable terminal 200 (1150).

Next, the server wireless communication module 312 of the server 300 transmits the encrypted token a+t encrypted with the public key a of the vehicle 100 and the encrypted token b+t encrypted with the public key b of the portable terminal 200 to the portable terminal 200 (1160), and the terminal controller 230 of the portable terminal 200 decrypts the encrypted token b+t encrypted with the public key b of the portable terminal 200 using the private key of the portable terminal 200 stored in the terminal storage device 220 (1170) to collect the token t and stores the collected token tin the terminal storage device 220.

Furthermore, the terminal controller 230 of the portable terminal 200 controls the terminal short-range communication module 211 to transmit the encrypted token a+t encrypted with the public key a of the vehicle 100 to the vehicle 100 (1180).

When the vehicle short-range communication module 111 of the vehicle 100 receives the encrypted token a+t encrypted with the public key a of the vehicle 100, the controller 130 decrypts the encrypted token a+t encrypted with the public key a of the vehicle 100 using the private key of the vehicle 100 stored in the vehicle storage device 120 to collect the token t (1190). The collected token t is stored in the vehicle storage device 120.

Meanwhile, the aforementioned embodiments may be implemented in a form of a recording medium storing instructions executable by a computer. The instructions may be stored in a form of program codes and perform the operation of the disclosed exemplary embodiments by creating a program module when executed by a processor. The recording medium may be embodied as a computer readable recording medium.

The computer readable recording medium includes all types of recording media that store instructions readable by a computer including read only memory (ROM), random access memory (RAM), magnetic tape, magnetic disc, flash memory, and optical data storage device.

As is apparent from the above description, a user may simply register a portable terminal in a vehicle by simplifying an authentication process according to an exemplary embodiment of the present invention.

According to an exemplary embodiment of the present invention, the portable terminal may be securely registered in the vehicle even when the vehicle is in the off-line state where wireless communications between the vehicle and the server is unavailable.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle system comprising:
    a vehicle configured to store a public key of the vehicle and a private key of the vehicle;
    a portable terminal configured to store the public key of the vehicle, a public key of the portable terminal, and a private key of the portable terminal; and
    a server configured to generate a token and encrypt the token with the public key of the vehicle and with the public key of the portable terminal,
    wherein the portable terminal transmits the public key of the portable terminal and the public key of the vehicle to the server, receives the token encrypted with the public key of the vehicle and the token encrypted with the public key of the portable terminal from the server and transmits the token encrypted with the public key of the vehicle to the vehicle, and decrypts the token encrypted with the public key of the portable terminal using the private key of the portable terminal, and
    wherein the vehicle receives the token encrypted with the public key of the vehicle from the portable terminal and decrypts the token encrypted with the public key of the vehicle using the private key of the vehicle,
    wherein the portable terminal transmits a token creation request signal to the server, and the server generates the token upon receiving the token creation request signal, wherein the transmitting of the token creation request signal to the server includes creating the private key and the public key of the portable terminal, and
    wherein the portable terminal generates the private key and the public key of the portable terminal and stores the generated private key and public key in a terminal storage device upon receiving a create token command via a terminal input device.

2. The vehicle system according to claim 1, wherein the portable terminal receives the public key of the vehicle from the vehicle.

3. The vehicle system according to claim 2, wherein the portable terminal receives the public key of the vehicle via a short-range communication method.

4. The vehicle system according to claim 1, wherein a vehicle identifier is attached to the vehicle, and
    the portable terminal determines the public key of the vehicle by recognizing the vehicle identifier attached to the vehicle.

5. The vehicle system according to claim 4, wherein the vehicle identifier comprises at least one of a bar code and a QR code.

6. The vehicle system according to claim 1, wherein the portable terminal transmits the token creation request signal, the public key of the portable terminal, and
    the public key of the vehicle to the server upon receiving the create token command via the terminal input device.

7. The vehicle system according to claim 1, wherein the vehicle stores the token decrypted using the private key of the vehicle as a first token and, upon receiving a second token from the portable terminal, authenticates the portable terminal based on whether the first token is a same as the second token.

8. A method of controlling a vehicle system, the method comprising:

transmitting a public key of a portable terminal which stores the public key of the portable terminal and a private key of the portable terminal and a public key of a vehicle which stores the public key of the vehicle and a private key of the vehicle to a server, the transmitting being performed by the portable terminal;

creating a token and encrypting the token with the received public key of the portable terminal and the token with the received public key of the vehicle, the creating and encrypting being performed by the server; and transmitting the encrypted token encrypted with the public key of the portable terminal and the encrypted token encrypted with the public key of the vehicle to the portable terminal, the transmitting being performed by the server;

decrypting the received encrypted token encrypted with the public key of the portable terminal using the private key of the portable terminal and transmitting the received encrypted token encrypted with the public key of the vehicle to the vehicle, the decrypting and transmitting being performed by the portable terminal;

decrypting the received encrypted token encrypted with the public key of the vehicle using the private key of the vehicle, the decrypting being performed by the vehicle, wherein the method further includes transmitting a token creation request signal to the server, the transmitting being performed by the portable terminal, before the portable terminal transmits the public key of the portable terminal and the public key of the vehicle to the server, wherein the creating of the token performed by the server includes creating a token when the server receives the token creation request signal, wherein the method further includes receiving a create token command via the terminal input device, the receiving being performed by the portable terminal, before transmitting the token creation request signal to the server, and wherein the transmitting of the token creation request signal to the server includes creating the private key and the public key of the portable terminal, the creating being performed by the portable terminal, when the terminal input device receives the create token command.

9. The method according to claim 8, further including receiving the public key of the vehicle from the vehicle, the receiving being performed by the portable terminal, before the portable terminal transmits the public key of the portable terminal and the public key of the vehicle to the server.

10. The method according to claim 9, wherein the portable terminal receives the public key of the vehicle via a short-range communication method.

11. The method according to claim 8, wherein a vehicle identifier is attached to the vehicle, and the method further includes determining the public key of the vehicle by recognizing the vehicle identifier attached to the vehicle, the determining being performed by the portable terminal, before the portable terminal transmits the public key of the portable terminal and the public key of the vehicle to the server.

12. The method according to claim 11, wherein the vehicle identifier includes at least one of a bar code and a QR code.

* * * * *